United States Patent [19]

Chester et al.

[11] 4,416,765

[45] Nov. 22, 1983

[54] CATALYTIC CRACKING

[75] Inventors: Arthur W. Chester, Cherry Hill; William E. Cormier, Jr., Clarksboro; William A. Stover, Woodbury, all of N.J.

[73] Assignee: Mobil Oil Corporation, New York, N.Y.

[21] Appl. No.: 408,109

[22] Filed: Aug. 16, 1982

Related U.S. Application Data

[63] Continuation-in-part of Ser. No. 301,851, Sep. 14, 1981, Pat. No. 4,368,114, which is a continuation-in-part of Ser. No. 100,585, Dec. 5, 1979, Pat. No. 4,309,279, which is a continuation-in-part of Ser. No. 50,588, Jun. 1, 1979, abandoned.

[51] Int. Cl.$^3$ ............................................. C10G 11/05
[52] U.S. Cl. ............................. 208/120; 208/DIG. 2; 208/52 CT; 208/135; 502/66; 502/67; 502/68; 502/71; 502/527
[58] Field of Search .................. 208/120, 113, DIG. 2

[56] References Cited

U.S. PATENT DOCUMENTS

| | | | |
|---|---|---|---|
| 3,649,521 | 3/1972 | Martin | 208/120 |
| 3,649,522 | 3/1972 | Martin | 208/74 X |
| 4,287,048 | 9/1981 | Gladrow et al. | 208/120 |
| 4,309,279 | 1/1982 | Chester et al. | 208/120 |
| 4,309,280 | 1/1982 | Rosinski et al. | 208/120 |
| 4,368,114 | 1/1983 | Chester et al. | 208/120 |

OTHER PUBLICATIONS

Shankland and Schmitkons, "Determination of Activity and Selectivity of Cracking Catalyst", Proc. API 27 (III) 1947, pp. 57-77.

Primary Examiner—Curtis R. Davis
Assistant Examiner—George E. Sohmitkons
Attorney, Agent, or Firm—Alexander J. McKillop; Michael G. Gilman; Dennis P. Santini

[57] ABSTRACT

Octane and overall product quality improvement in catalytic cracking processes utilizing an essentially entirely amorphous cracking catalyst can be attained by using instead a catalyst comprising a minor amount, e.g. from about 0.01 to about 25 weight percent, of a class of crystalline zeolites characterized by a silica to alumina mole ratio greater than about 12 and a constraint index of about 1 to 12. The crystalline zeolites may be added to the conventional amorphous cracking catalyst in the cracking process by way of adding a separate additive composition in an amount which provides the zeolite component of the additive composition in said minor amount of the total catalyst in the cracking process.

26 Claims, No Drawings

CATALYTIC CRACKING

CROSS REFERENCE TO RELATED APPLICATIONS

This application is a continuation-in-part of application Ser. No. 301,851, filed Sept. 14, 1981, now U.S. Pat. No. 4,368,114, which was a continuation-in-part of application Ser. No. 100,585, filed Dec. 5, 1979, now U.S. Pat. No. 4,309,279, which was a continuation-in-part of application Ser. No. 050,588, filed June 1, 1979, now abandoned.

BACKGROUND OF THE INVENTION

1. Field of the Invention

This invention relates to an improvement in a cracking process designed for use of an entirely amorphous cracking catalyst. The improvement resides in product of increased gasoline quality and octane number being obtained while not significantly affecting total yield in catalytic cracking units which are designed to utilize in the normal course an amorphous catalyst. The improved process involves operation of said cracking process with a cracking catalyst which is only from about 0.01 to about 25 weight percent crystalline zeolite of a particular type, the remainder being the conventional amorphous cracking catalyst component normally used in the process. The crystalline zeolite component may be included in the otherwise amorphous catalyst composition or may be added to the amorphous catalyst inventory by means of separate additive composition comprising the crystallic zeolite to provide the minor amount of said zeolite therein.

2. Description of the Prior Art

Hydrocarbon conversion processes utilizing crystalline zeolites have been the subject of extensive investigation during recent years, as is clear from both the patent and scientific literature. Crystalline zeolites have been found to be particularly effective for a wide variety of hydrocarbon conversion processes including the catalytic cracking of a gas oil to produce motor fuels and have been described and claimed in many patents, including U.S. Pat. Nos. 3,140,249; 3,140,251; 3,140,252; 3,140,253; and 3,271,418. It is also known in the prior art to incorporate the crystalline zeolite into a matrix for catalytic cracking and such disclosure appears in one or more of the above-identified U.S. patents.

It is also known that improved results will be obtained with regard to the catalytic cracking of gas oils if a crystalline zeolite having a pore size of less than 7 Angstrom units is included with a crystalline zeolite having a pore size greater than 8 Angstrom units, either with or without a matrix. A disclosure of this type is found in U.S. Pat. No. 3,769,202. Although the incorporation of a crystalline zeolite having a pore size of less than 7 Angstrom units into a catalyst composite comprising a larger pore size crystalline zeolite (pore size greater than 8 Angstrom units) has indeed been very effective with respect to the raising of octane number, nevertheless it did so at the expense of the overall yield of gasoline.

Improved results in catalytic cracking with respect to both octane number and overall yield achieved in U.S. Pat. No. 3,758,403. In said patent, the cracking catalyst was comprised of a large pore size crystalline zeolite (pore size greater than 7 Angstrom units) in admixture with ZSM-5 type zeolite wherein the ratio of ZSM-5 type zeolite to large pore size crystalline zeolite was in the range of 1:10 to 3:1.

The use of ZSM-5 type zeolite in conjunction with a zeolite cracking catalyst of the X or Y faujasite variety is described in U.S. Pat. Nos. 3,894,931; 3,894,933; and 3,894,934. The two former patents disclose the use of ZSM-5 type zeolite in amounts up to and about 5 to 10 weight percent; the latter patent discloses the weight ratio of ZSM-5 type zeolite to large pore size crystalline zeolite in the range of 1:10 to 3:1.

It is extremely desirable to provide a process which will provide high octane unleaded gasoline without undue sacrifice of gasoline yield for the refiner operating a cracking process utilizing an entirely amorphous cracking catalyst. It is even more desirable if such results could be obtained in conjunction with an increase in operational flexibility and without undue use of expensive catalysts.

The criticality of using only small amounts of catalyst comprising ZSM-5 class zeolite to achieve improved results with respect to overall product quality and octane number while not significantly affecting yield in a cracking process utilizing an inventory of otherwise amorphous cracking catalyst has heretofore not been recognized in the art. It is the basis of the present invention that the addition of only small quantities of zeolite ZSM-5 type crystalline material to an entirely amorphous cracking catalyst inventory in the process designed for said amorphous catalyst will give these beneficial results. It is to be understood that to obtain these beneficial results the ZSM-5 type zeolite may be included in the otherwise amorphous catalyst composition or, in a preferred embodiment, may be added to the amorphous cracking catalyst inventory by means of separate additive composition comprising the ZSM-5 type zeolite. Such method would provide the refiner increase operational flexibility since only a small quantity of additive composition can improve the octane number of the gasoline product significantly.

It is noted that U.S. Pat. Nos. Re. 29,857 and 3,926,782 suggest the use of zeolite ZSM-5 as a cracking catalyst component in an amount from 1 to 90 weight percent with a matrix. Specific catalytic cracking processes are taught in U.S. Pat. Nos. 3,748,251; 3,894,933; 3,951,781 and 4,002,552. These processes use zeolite cracking catalysts, in general, and zeolite ZSM-5 specifically in varying amounts in catalyst compositions to provide various results.

SUMMARY OF THE INVENTION

In accordance with the present invention, there has now been discovered an improved process to upgrade product quality and octane number without significantly affecting total yield in catalytic cracking units designed for and employing a catalyst comprised essentially entirely of amorphous materials, such as, for example, silica-alumina or clay. By replacing the amorphous catalyst with a catalyst comprising only from about 0.01 to about 25 weight percent crystalline zeolite component characterized by a silica to alumina mole ratio of at least 12 and a Constraint Index, hereinafter defined, of from about 1 to about 12 and from about 75 to about 99.99 weight percent amorphous cracking component, there is a significant improvement in the octane number and overall quality of the resultant gasoline, while not significantly affecting the total yield. This may be conveniently accomplished by addition of a small amount of separate additive composition comprising the crystalline zeolite to the conventional amorphous cracking catalyst inventory in the process such as to provide from about 0.01 to about 25 weight percent of the crystalline zeolite. The totally unexpected discovery of this invention will be of great significance in the field of petroleum refining.

The improved process of this invention affords the refiner utilizing an essentially entirely amorphous cracking catalyst great flexibility in catalytic cracking operation, since only a small quantity of additive composition can quickly boost the octane number and quality of the product. The need for only small quantities of said additive composition will also result in great savings in catalyst usage and would thus result in more economic refinery operations.

The separate additive composition of this invention, if used to provide the required catalyst in the process, will comprise the class of crystalline zeolites which are characterized by a silica to alumina mole ratio of at least 12 and a constraint index of about 1 to 12. The additive composition can be introduced to the cracking process at any time and at any point for quick octane improvement. The zeolite component of the additive composition ranges from about 10 weight percent to about 100 weight percent of the total additive composition and will be added at a rate necessary to provide the required quantity of said crystalline zeolite to the amorphous catalyst inventory in the process.

EMBODIMENTS

The entire contents of each application to which the present application is related, i.e. Ser. Nos. 301,851; 100,585 and 50,588, are incorporated herein by reference.

It is to be understood that the "catalyst" for use in the present improved process for catalytic cracking of petroleum fractions comprises two components. The first component is a major amount i.e. from about 75 weight percent to about 99.99 weight percent, preferably from about 90 weight percent to about 99.99 weight percent, of essentially entirely amorphous cracking component, hereinafter defined. The second component is a minor amount, i.e., from about 0.01 weight percent to about 25 weight percent, preferably from about 0.01 weight percent to about 10 weight percent, of crystalline zeolite component which is characterized by a Constraint Index of from about 1 to about 12 and a silica to alumina mole ratio of greater than 12. This "catalyst" may be formulated in situ by adding a "separate additive composition" comprising said crystalline zeolite component to the amorphous cracking catalyst inventory already in the cracking process. The rate and amount of separate additive composition added to the cracking catalyst inventory is controlled in order to provide the minor amount of crystalline zeolite component therein necessary for the catalyst inventory to be composed within the above definition of "catalyst". The process which is improved hereby is a catalytic cracking process designed to utilize an essentially entirely amorphous catalyst.

Addition of a separate additive composition comprising one or more members of the class of crystalline zeolites, as defined hereinafter, is extremely effective as an octane and overall product quality improver in small amounts when used in conjunction with a conventional essentially entirely amorphous cracking catalyst. It has been found that only about 0.01 to about 25 wt. % of this class of zeolites added to the amorphous cracking catalyst in the unit under conventional cracking operation can increase octane by about 0.5 to 3 RON+0 (research octane number without lead). Octane increase can be varied with the content of the zeolite component of the additive composition. If excess alkylation capacity is available, $C_5{}^+$ composition. If excess alkylation capacity is available, $C_5{}^+$ gasoline plus alkylate yields may be higher when the additive composition is utilized as compared to conventional commercial amorphous cracking catalysts, without sacrificing the octane increase.

Since the crystalline zeolites of the catalyst for use herein are very active catalytically in the fresh state, only minor quantities are necessary to obtain substantial octane improvement in a commercial cracking unit. Thus the refiner is afforded great flexibility in commercial cracking operation, since the additive composition can be quickly introduced, because such a small quantity is required as compared to the total inventory of catalyst. The refiner can efficiently control the magnitude of octane increase by controlling the rate of additive composition addition. This type of flexibility could be useful in situations where feed composition or rate changes occur, when demand for high octane gasoline (unleaded) fluctuates, or when capacity for alkylation varies due to mechanical problems or changes in overall refinery operation.

It is clear from the foregoing that octane gain can be controlled to the extent desired by the introduction of only small amounts of additive composition. In commercial practice, the octane gain could be maximized or controlled to operate at maximum light gas handling capability or full alkylation capacity.

The particular proportion of the crystalline zeolite component of the catalyst in the present invention is important in that such a small amount of said zeolite is required to produce substantial octane gains. The weight percent of the crystalline zeolite required in relation to the total quantity of catalyst in the unit can range from about 0.01 to about 25, and preferably from about 0.01 to about 10. The exact weight percent will vary from cracking unit to cracking unit depending on the desired octane number, total gasoline yield required, the available feedstock and the activity of the conventional amorphous cracking component.

When the zeolite is added by way of separate additive composition, the additive composition can be injected at any time during the catalytic cracking process. The additive composition can be introduced while the cracking unit is down, or while the cracking unit is on stream operation. Once the additive composition is added to the cracking process, the refiner can return to conventional operation or an operation at lower octane number by eliminating or decreasing the use of additive composition. Thus the increase in octane number over the number obtainable under conventional cracking operations can be controlled by controlling the amount of additive composition added to the process.

Catalytic cracking units which are amenable to the process of this invention are designed to utilize an essentially entirely amorphous catalyst and operate within the temperature range of about 400° F. to 1300° F. and under reduced atmospheric or superatmospheric pressure. The catalytic cracking process may be operated batchwise or continuously. The catalytic cracking process can be either fixed bed, moving bed or fluidized bed and the hydrocarbon charge stock flow may be either concurrent or countercurrent to the conventional catalyst flow. The process of this invention is particularly applicable to the fluid catalytic cracking (FCC) process.

In actual operation of such units, because the catalytic activity of the circulating inventory of catalyst tends to decrease with age, fresh makeup catalyst usually amounting to about 1 or 2% of the circulating inventory may be added per day to maintain optimal catalyst activity, with daily withdrawal plus losses of about like amount of aged circulating inventory.

It is a feature of the present invention that when separate additive composition is desired, it may be introduced in an FCC process without disruption the operation of the process. The additive composition may be introduced into the FCC process at almost any convenient point. Preferred points of injection are into a regenerated catalyst transfer conduit, or into the catalyst bed, or into a stripping zone, or into a spent catalyst transfer conduit, or into a regenerator zone, or more particularly in a regenerator zone in the dense bed of suspended catalyst particles. The additive composition may also be injected into a hot catalyst storage hopper or mixed with fresh catalyst in a fresh catalyst storage hopper, or other vessel before addition to the unit.

The amount of additive composition, when used, required to increase gasoline octane number in the present process is generally based on the total quantity of conventional amorphous cracking catalyst in the unit, i.e. on the circulating inventory of conventional amorphous cracking catalyst in the process. For example, if the additive composition is first introduced via the addition of fresh makeup catalyst, the amount of zeolite constituent in the additive composition required would be quite high if compared against the amount of fresh makeup catalyst added. However, after a period of time of fresh makeup catalyst addition, and once the amount of zeolite in the additive composition is maintained at the prescribed limits as compared to the circulating inventory of conventional amorphous cracking catalyst, the amount of said zeolite in the fresh makeup catalyst addition will be much lower than initially.

A recent advance in the art of catalytic cracking is disclosed in U.S. Pat. No. 4,072,600, the entire contents of which are incorporated herein by reference. One embodiment of this aforesaid patent teaches that trace amounts of a metal selected from the group consisting of platinum, palladium, iridium, osmium, rhodium, ruthenium, and rhenium when added to cracking catalysts enhance significantly conversion of carbon monoxide during the catalyst regeneration operation.

In employing this recent advance to the present invention, the amount of said metal added to the catalyst can vary from about 0.01 ppm to about 100 ppm based on total catalyst inventory. The aforesaid metals can also be introduced into the process via the separate additive composition in amounts from about 1.0 ppm to about 1000 ppm based on total additive composition.

After cracking, the resulting product gas is compressed and the resulting products may suitably be separated from the remaining components by conventional means such as adsorption, distillation, etc.

Hydrocarbon charge stocks undergoing cracking in accordance with this invention conprise hydrocarbons generally and, in particular, petroleum fractions having an initial boiling point of at least 400° F., a 50% point of at least 500° F. and an end point of at least 600° F. Such hydrocarbon fractions include gas oils, residual oils, cycle stocks, whole top crudes and heavy hydrocarbon fractions derived by the destructive hydrogeneration of coal, tar, pitches, asphalts and the like. As will be recognized, the distillation of higher boiling petroleum fractions above about 750° F. must be carried out under vacuum in order to avoid thermal cracking. The boiling temperatures utilized herein are expressed in terms of convenience of the boiling point corrected to atmospheric pressure.

The members of the class of crystalline zeolites for use in this invention are characterized by a pore dimension greater than about 5 Angstroms, i.e., it is capable of sorbing paraffins having a single methyl branch as well as normal paraffins, and it has a silica to alumina mole ratio of at least 12. Zeolite A, for example, with a silica to alumina ratio of 2.0, is not useful in this invention, and moreover it has no pore dimension greater than about 5 Angstroms.

The members of the class of crystalline zeolites for use herein constitute an unusual class of natural and synthetic minerals. They are characterized by having a rigid crystalline framework structure composed of an assembly of silicon and aluminum atoms, each surrounded by a tetrahedron of shared oxygen atoms, and a precisely defined pore structure. Exchangeable cations are present in the pores.

These zeolites induced profound transformations of aliphatic hydrocarbons to aromatic hydrocarbons in commercially desirable yields and are generally highly effective in alkylation, isomerization, disproportionation and other reactions involving aromatic hydrocarbons. Although they have unusually low alumina contents, i.e., high silica to alumina mole ratios, they are very active even with silica to alumina mole ratios exceeding 30. This activity is surprising, since catalytic activity of zeolites is generally attributed to framework aluminum atoms and cations associated with these aluminum atoms. Thise zeolites retain their crystallinity for long periods in spite of the presence of steam even at high temperatures which induce irreversible collapse of the crystal framework of other zeolites, e.g. of the X and A type. Furthermore, carbonaceous deposits, when formed, may be removed by burning at higher than usual temperatures to restore activity. In many environments, the zeolites of this class exhibit very low coke forming capability, conducive to very long times on stream between burning regenerations.

An important characteristic of the crystal structure of this class of zeolites is that it provides constrained access to, and egress from, the intracrystalline free space by virtue of having a port dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline zeolite, the oxygen atoms themselves being bonded to the silicon or aluminum atoms at the centers of the tetrahedra. Briefly, the preferred zeolites useful herein possess, in combination: a Constraint Index, as hereinafter defined, of about 1 to 12, a silica to alumina mole ratio of at least about 12, and a structure providing constrained access to the intracrystalline free space.

The silica to alumina mole ratio referred to may be determined by conventional analysis. This retio is meant to represent, as closely as possible, the ratio in the rigid anionic framework of the zeolite crystal and to exclude aluminum in the binder or in cationic or other form within the channels.

Although such crystalline zeolites with a silica to alumina mole ratio of at least about 12 are useful, it is preferred to use zeolites having higher ratios of at least about 30. In some zeolites, the upper limit of silica to alumina mole ratio is unbounded, with values of 30,000 and greater, extending at least theoretically up to infinity. Therefore, the silica to alumina mole ratio of the zeolite for use herein may be from about 12 to infinity, preferably from about 30 to infinity. Such zeolites, after activation, acquire an intracrystalline sorption capacity for normal hexane which is greater than that for water, i.e., they exhibit "hydrophobic" properties. It is believed that this hydrophobic character is advantageous in the present invention.

The crystalline zeolites for use in this invention freely sorb normal hexane and have a pore dimension greater than about 5 Angstroms. In addition, their structure must provide constrained access to some larger molecules. It is sometimes possible to judge from a known crystal structure whether such constrained access exists. For example, if the only pore windows in a crystal are formed by 8-membered rings of oxygen atoms, then access by molecules of larger cross-section than normal hexane is substantially excluded and the zeolite is not of the desired type. Zeolites with windows of 10-member rings are preferred, although excessive puckering or pore blockage may render these zeolites substantially ineffective. Zeolites with windows of 12-membered rings do not generally appear to offer sufficient constraint to produce the advantageous conversions desired in the instant invention, although structures can be conceived, due to pore blockage or other cause, that may be operative.

Rather than attempt to judge from crystal structure whether or not a zeolite possesses the necessary constraint access, a simple determination of the "Constraint Index" may be made by continuously passing a mixture of equal weight of normal hexane and 3-methylpentane over a small sample, approximately 1 gram or less, of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 1000° F. for at least 15 minutes. The zeolite is then flushed with helium and the temperature adjusted between 550° and 950° F. to give an overall conversion between 10% and 60%. The mixture of hydrocarbons is passed at 1 liquid hourly space velocity (i.e., 1 volume of liquid hydrocarbon per volume of catalyst per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "Constraint Index" is calculated as follows:

$$\text{Constraint Index} = \frac{\log_{10}(\text{fraction of n-hexane remaining})}{\log_{10}(\text{fraction of 3-methylpentane remaining})}$$

The Constraint Index approximates the ratio of the cracking rate constants for the two hydrocarbons. Zeolites suitable for the present invention are those which have a Constraint Index from 1 to 12. Constraint Index (C.I.) values for some typical materials are:

| Zeolite | C.I. |
|---|---|
| REY | 0.4 |
| H—Zeolon (mordenite) | 0.4 |
| ZSM-4 | 0.5 |
| Acid Mordenite | 0.5 |
| Beta | 0.6 |
| Amorphous Silica-Alumina | 0.6 |
| ZSM-12 | 2 |
| ZSM-38 | 2 |
| ZSM-48 | 3.4 |
| Clinoptilolite | 3.4 |
| TMA Offretite | 3.7 |
| ZSM-35 | 4.5 |
| ZSM-5 | 8.3 |
| ZSM-11 | 8.7 |
| ZSM-23 | 9.1 |
| Erionite | 38 |

The above-described Constraint Index is an important and even critical definition of those zeolites which are useful in the instant invention. The very nature of this parameter and the recited technique by which it is determined, however, admit of the possibility that a given zeolite can be tested under somewhat different conditions and thereby have different constraint indexes. Constraint Index seems to vary somewhat with severity of operation (conversion). Therefore, it will be appreciated that it may be possible to so select test conditions to establish multiple constraint indexes for a particular given zeolite which may be both inside and outside the above-defined range of 1 to 12.

Thus, it should be understood that the parameter and property "Constraint Index" as such value is used herein is an inclusive rather than an exclusive value. That is, a zeolite when tested by any combination of conditions within the testing definition set forth hereinabove to have a Constraint Index of 1 to 12 is intended to be included in the instant catalyst definition regardless that the same identical zeolite tested under other defined conditions may give a Constraint Index value outside of 1 to 12.

The members of the class of zeolites for use herein are exemplified by ZSM-5, ZSM-5/ZSM-11 intermediate, ZSM-11, ZSM-12, ZSM-23, ZSM-35, ZSM-38, ZSM-48 and other similar materials. U.S. Pat. No. 3,702,886 describing and claiming ZSM-5 is incorporated herein by reference. Also, U.S. Pat. No. Re. 29,948 describing and claiming a crystalline material with an X-ray diffraction pattern of ZSM-5, is incorporated herein by reference as is U.S. Pat. No. 4,061,724 describing a high silica ZSM-5 referred to as "silicalite" in such patent.

The ZSM-5/ZSM-11 intermediate is described in U.S. Pat. No. 4,229,424, the entire contents of which are incorporated herein by reference.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-23 is more particularly described in U.S. Pat. No. 4,076,842, the entire contents of which are incorporated herein by reference.

ZSM-35 is more particularly described in U.S. Pat. No. 4,016,245, the entire contents of which are incorporated herein by reference.

ZSM-38 is more particularly described in U.S. Pat. No. 4,046,859, the entire contents of which are incorporated herein by reference.

ZSM-48 is more particularly described in European Patent Application No. 80-300,463, published Sept. 3, 1980 as Publication No. 0015132, the entire contents of which are incorporated herein by reference.

Natural zeolites may sometimes be converted to this class of zeolites by various activation procedures and other treatment such as base exchange, steaming, alumina extraction and calcination, alone or in combinations. Natural minerals which may be so treated include ferrierite, brewsterite, stilbite, dachiardite, epistilbite, heulandite and clinoptilolite. The preferred zeolites of the additive catalyst are ZSM-5, ZSM-5/ZSM-11 intermediate, ZSM-11, ZSM-12, ZSM-23, ZSM-35, ZSM-38 and ZSM-48, with ZSM-5 -particularly preferred.

The zeolites used in additive catalysts in this invention may be in the hydrogen form or they may be base exchanged or impregnated to contain a rare earth cation complement. Such rare earth cations comprise Sm, Nd, Pr, Ce and La. It is desirable to calcine the zeolite after base exchange.

In a preferred aspect of this invention, the crystalline zeolites are selected as those having a crystal framework density, in the dry hydrogen form, of not substantially below about 1.6 grams per cubic centimeter. It has been found that zeolites which satisfy all three of these criteria are most desired. Therefore, the preferred crystalline zeolite for use in this invention are those having a Constraint Index as defined above of about 1 to 12, a silica to alumina mole ratio of at least about 12 and a dried crystal density of not substantially less than about 1.6 grams per cubic centimeter. The dry density for known structures may be calculated from the number of silicon plus aluminum atoms per 1000 cubic Angstroms, as given, e.g., on page 19 of the article on *Zeolite Structure* by W. M. Meier. This paper is included in *Proceedings of the Conference on Molecular Sieves, London, April 1967*, published by the Society of Chemical Industry, London, 1968. When the crystal structure is unknown, the crystal framework density may be determined by classical pycnometer techniques. For example, it may be determined by immersing the dry hydrogen form of the zeolite in an organic solvent which is not sorbed by the crystal. It is possible that the unusual sustained acitivity and stability of this class of zeolites are associated with its high crystal anionic framework density of not less than about 1.6 grams per cubic centimeter. This high density, of course, must be associated with a relatively small amount of free space within the crystal, which might be expected to result in more stable structures. This free space, however, seems to be important as the locus of catalytic activity.

Crystal framework densities of some typical zeolites, including some which are not within the purview of this invention, are:

| Zeolite | Void Volume | Framework Density |
|---|---|---|
| Ferrierite | 0.28 cc/cc | 1.76 g/cc |
| Mordenite | .28 | 1.7 |
| ZSM-5, -11 | .29 | 1.79 |
| ZSM-12 | — | 1.8 |
| ZSM-23 | — | 2.0 |
| Dachiardite | .32 | 1.72 |
| L | .32 | 1.61 |
| Clinoptilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

The catalyst and separate additive composition for use in this invention may be prepared in various ways. They may be separately prepared in the form of particles such as pellets or extrudates, for example, and simply mixed in the required proportions. The particle size of the individual component particles may be quite small, for example from about 20 to about 50 microns, when intended for use in fluid bed operation, or they may be as large as up to about ½ inch for fixed bed operation. Or the components may be mixed as powders and formed into pellets or extrudate, each pellet containing both components in substantially the required proportions.

It is desirable to incorporate the zeolite component of the separate additive composition in a matrix. Such matrix is useful as a binder and imparts greater resistance to the catalyst for the severe temperature, pressure and velocity conditions encountered in many cracking processes.

Matrix materials include both synthetic and natural substances. Such substances include clays, silica and/or metal oxides. The latter may be either naturally occurring or in the form of gelatinous precipitates, sols or gels including mixtures of silica and metal oxides. Frequently, zeolite materials have been incorporated into naturally occurring clays, e.g. bentonite and kaolin.

In addition to the foregoing materials, the zeolite for use herein can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of clay in combination with silica or any of the above specified cogels to form a matrix is highly preferred.

In genreral, the crystalline zeolites of the catalyst and separate additive composition for use herein are ordinarily ion exchanged either separately or, in the case of additive composition, in the final preparation of such additive composition, with a desired cation to replace alkali metal present in the zeolite as found naturally or as synthetically prepared. The exchange treatment is such as to reduce the alkali metal content to less than about 50% by weight of the original alkali metal contained in the zeolite as synthesized, usually 0.5 weight percent or less. The purpose of ion exchange is to substantially remove alkali metal cations which are known to be deleterious to cracking, as well as to introduce particularly desired catalytic activity by means of the various cations used in the exchange medium. For the cracking operation described herein, preferred cations are hydrogen, ammonium, rare earth and mixtures thereof, with particular preference being accorded rare earth. Ion exchange is suitably accomplished by conventional contact of the zeolite with a suitable salt solution of the desired cation such as, for example, the sulfate, chloride or nitrate.

The conventional amorphous cracking catalyst comprising the cracking unit inventory of the process improved hereby will be selected from the group consisting of clay, silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. Said clay cracking catalysts may include those prepared from acid-treated kaolin or halloysite, for example. Of course, mixtures of such amorphous catalyst materials may also be used, including a mixture of clay with silica.

The following examples will serve to illustrate the invention.

EXAMPLE 1

A conventional essentially entirely amorphous cracking catalyst having the physical and chemical properties listed in Table 1 was commercially obtained.

TABLE 1

| Physical Properties | |
|---|---|
| Loose Density, g/cc | 0.74 |
| Packed Density, g/cc | 0.85 |
| Particle Density, g/cc | 1.257 |
| Pore Volume, cc/g | 0.361 |
| Pore Diameter, Angstroms (ave.) | 114 |
| Void Volume, cc | 0.381 |
| Crystallinity, wt. % | less than 0.3 |
| Chemical Properties | |
| $SiO_2$, wt. % | 84.3 |
| $Al_2O_3$, wt. % | 15.0 |
| $Re_2O_3$, wt. % | less than 0.15 |
| $ZrO_2$, wt. % | 0.04 |
| Na, wt. % | 0.019 |
| Ni, ppm | 328 |
| V, ppm | 724 |
| Cu, ppm | 36 |
| Fe, ppm | 52.25 |
| Pb, ppm | less than 10 |

EXAMPLE 2

An essentially entirely amorphous cracking catalyst was manufactured by spray drying a composition containing 60.5 wt. % silica, 4.5 wt. % alumina and 35 wt. % kaolin clay. The dried amorphous catalyst composition was column exchanged with a 5% aqueous solution of ammonium sulfate and then water washed substantially free of sulfate. The washed composition was then further exchanged with a 1% aqueous solution of rare earth chlorides, water washed substantially free of chloride and dried at 250° F. for at least 16 hours. The dried catalyst was then calcined at 1200° F. for 0.5 hour with nitrogen in a fluidized bed.

EXAMPLE 3

A catalyst for use in the present process containing a crystalline zeolite was prepared by spray drying 25 wt. % zeolite ZSM-5 (low sodium type, commercially manufactured) in a semisynthetic matrix containing 69.8 wt. % silica, 5.2 wt. % $Al_2O_3$ and 25 wt. % kalin clay. The ZSM-5 employed had a silica to alumina ratio of 63.4, a sodium content of 0.02 weight percent, a nitrogen content of 1.41 weight percent and a carbon content of 5.25 wt. %. The spray dried catalyst was column exchanged with a 5% aqueous ammonium sulfate solution, water washed substantially free of sulfate and then dried at 250° F. for at least 16 hours. The catalyst was analyzed chemically and found to contain (dry basis) 85.2% $SiO_2$, 14.2% $Al_2O_3$ and 0.01% Na. The dried catalyst was then calcined at 1200° F. for 0.5 hour with $N_2$ in a fluidized bed.

EXAMPLE 4

This example will illustrate the catalytic cracking of a gas oil with a conventional amorphous cracking catalyst. There was no additive composition used in this example. Thus, this example is not meant to be representative of the present invention, but will serve as a comparative example.

The amorphous catalyst of Example 2 was contacted with Joliet Sour Heavy Gas Oil (JSHGO) with properties given in Table 2 in a fixed-fluidized bed bench unit at 942° F., a weight hourly space velocity of 29.96 $hr^{-1}$, and a catalyst/oil ratio of 2. The results of this example are given in Table 3.

TABLE 2

| Chargestock | Joliet Sour Heavy Gas Oil (JSHGO) |
|---|---|
| Gravity, °API | 24.3 |
| Aniline Pt., °F. | 171 |
| Sulfur, wt. % | 1.87 |
| Nitrogen, wt. % | 0.03 |
| Basic Nitrogen, ppm | 327 |
| Conradson Carbon, wt. % | 0.29 |
| Viscosity, KV at 210° F., cs | 3.62 |
| Bromine No. | 4.2 |
| R.I. at 70° F. | 1.5080 |
| Hydrogen, wt. % | 12.3 |
| Molecular Weight | 358 |
| Pour Point, °F. | 85 |
| Paraffins, wt. % | 23.5 |
| Naphthenes, wt. % | 32.0 |
| Aromatics, wt. % | 44.5 |
| $C_A$, ndm | 18.9 |

TABLE 3

| | |
|---|---|
| Conversion, vol. % | 53.7 |
| $C_5$ + Gasoline, vol. % | 27.0 |
| Total $C_4$'s, vol. % | 20.5 |
| Dry Gas, wt. % | 13.0 |
| Coke, wt. % | 3.14 |
| $H_2$, wt. % | 0.07 |
| $C_5$ + Gasoline + Alkylate, vol. % | 75.5 |
| RON + O, $C_5$ + Gasoline | 92.9 |
| RON + O, $C_5$ + Gasoline + Alkylate | 93.5 |
| n-$C_4$, vol. % | 0.9 |
| i-$C_4$, vol. % | 6.7 |
| $C_4=$, vol. % | 12.8 |
| $C_3$, vol. % | 3.0 |
| $C_3=$, vol. % | 16.3 |
| $C_2$, wt. % | 0.4 |
| $C_2=$, wt. % | 1.1 |

EXAMPLE 5

This example will serve to illustrate the beneficial effects of using the catalyst containing a minor portion of the crystalline zeolite in the process of this invention in a conventional catalytic cracking process otherwise utilizing an essentially entirely amorphous catalyst.

The catalyst as prepared in Example 3 was contacted with the same type gas oil as used in Example 4 in a fixed-fluidized bed bench unit at 240° F., a weight hourly space velocity of 29.96 $hr^{-1}$ and cat/oil of 2. The results of this example are given in the following Table 4.

TABLE 4

| | |
|---|---|
| Conversion, vol. % | 63.2 |
| $C_5$ + Gasoline, vol. % | 23.7 |
| Total $C_4$'s, vol. % | 22.0 |
| Dry Gas, wt. % | 20.7 |
| Coke, wt. % | 4.57 |
| $H_2$, wt. % | 0.07 |
| $C_5$ + Gasoline + Alkylate, vol. % | 65.0 |
| RON + O, $C_5$ + Gasoline | 95.4 |
| RON + O, $C_5$ + Gasoline + Alkylate | 94.2 |
| n-$C_4$, vol. % | 2.6 |
| i-$C_4$, vol. % | 10.5 |
| $C_4=$, vol. % | 8.8 |
| $C_3$, vol. % | 12.1 |
| $C_3=$, vol. % | 16.2 |
| $C_2$, wt. % | 0.7 |
| $C_2=$, wt. % | 3.1 |

EXAMPLES 6 and 7

The procedure of Examples 4 and 5 were repeated except that the weight hourly space velocities were 30.04 and 30.09, and the reaction temperatures were 934° F. and 935° F. for Examples 6 (catalyst from Example 2) and 7 (catalyst from Example 3), respectively. The feedstock oil was identical. Both the entirely amorphous and 25 wt. % zeolite catalysts where pretreated by heating at 1200° F. for 0.5 hours. The cat/oil for Example 7 was 1.99. The results of these two examples are shown in Table 5.

TABLE 5

| | Example 6 (amorphous catalyst) | Example 7 (amorphous catalyst + 25 wt. % zeolite) |
|---|---|---|
| Conversion, vol. % | 52.8 | 64.4 |
| $C_5$ + Gasoline, vol. % | 28.7 | 25.3 |
| Total $C_4$'s, vol. % | 21.8 | 26.4 |
| Dry Gas, wt. % | 10.3 | 19.5 |
| Coke, wt. % | 3.05 | 4.64 |
| $H_2$, wt. % | 0.09 | 0.16 |
| $C_5$ + Gasoline + Alkylate, vol. % | 71.6 | 53.9 |
| RON + O, $C_5$ + Gasoline | 94.0 | 96.0 minimum |
| RON + O, $C_5$ + Gasoline + Alkylate | 94.1 | — |
| n-$C_4$, vol. % | 1.0 | 5.2 |
| i-$C_4$, vol. % | 6.7 | 13.1 |
| $C_4=$, vol. % | 14.0 | 8.1 |
| $C_3$, vol. % | 2.5 | 16.8 |
| $C_3=$, vol. % | 11.6 | 9.1 |
| $C_2$, wt. % | 0.3 | 0.8 |
| $C_2=$, wt. % | 0.9 | 2.5 |

EXAMPLES 8–13

Additional experiments were conducted with the JSHGO feedstock used above to demonstrate the present process at various cat/oil ratios, weight hourly space velocities and reaction temperatures as follows:

| | Example | | | | | |
|---|---|---|---|---|---|---|
| | 8 | 9 | 10 | 11 | 12 | 13 |
| Cat/Oil | 5 | 4 | 3 | 5 | 4 | 3 |
| WHSV, hr$^{-1}$ | 12 | 15 | 20 | 12 | 15 | 20 |
| Temperature, °F. | 925 | 926 | 925 | 930 | 929 | 925 |

Examples 8, 9 and 10 were conducted over the amorphous cracking catalyst of Example 1. Examples 11, 12 and 13 were conducted over that amorphous ctalyst having the catalyst of Example 3 added as a separate additive composition in amount to provide 2 wt. % crystalline zeolite component in the catalyst inventory. The separate additive composition in each instance was steamed for 10 hours at 1240° F. (45% steam) at 0 psig prior to addition to the amorphous catalyst in the process. The results of these experiments are presented in Table 6.

TABLE 6

| | Example | | | | | |
|---|---|---|---|---|---|---|
| | 8 | 9 | 10 | 11 | 12 | 13 |
| Conversion, vol. % | 53.2 | 47.5 | 42.1 | 53.0 | 46.7 | 40.8 |
| $C_5$ + Gasoline, vol. % | 41.0 | 38.7 | 35.4 | 37.8 | 36.0 | 31.4 |
| Total $C_4$'s, vol. % | 10.8 | 8.7 | 7.0 | 12.8 | 10.4 | 8.6 |
| Dry Gas, wt. % | 6.1 | 5.3 | 4.7 | 7.4 | 5.9 | 5.3 |
| Coke, wt. % | 4.61 | 3.62 | 3.09 | 4.29 | 3.31 | 3.18 |
| $H_2$, wt. % | 0.33 | 0.29 | 0.24 | 0.32 | 0.25 | 0.20 |
| $C_5$ + Gasoline + Alkylate, vol. % | 61.3 | 55.9 | 49.3 | 63.7 | 57.1 | 49.3 |
| RON + O, $C_5$ + Gasoline | 91.1 | 91.0 | 89.0 | 92.2 | 91.4 | 92.2 |
| RON + O, $C_5$ + Gasoline + Alkylate | 92.2 | 92.0 | 90.5 | 93.0 | 92.5 | 92.9 |
| n-$C_4$, vol. % | 0.8 | 0.7 | 0.6 | 0.7 | 0.5 | 0.4 |
| i-$C_4$, vol. % | 3.3 | 2.4 | 2.0 | 3.9 | 3.0 | 2.4 |
| $C_4=$, vol. % | 6.7 | 5.6 | 4.5 | 8.2 | 6.8 | 5.8 |
| $C_3$, vol. % | 1.1 | 0.8 | 0.8 | 1.5 | 1.1 | 1.0 |
| $C_3=$, vol. % | 5.5 | 4.6 | 3.9 | 7.3 | 5.8 | 4.9 |
| $C_2$, wt. % | 0.5 | 0.4 | 0.4 | 0.5 | 0.4 | 0.4 |
| $C_2=$, wt. % | 0.3 | 0.3 | 0.3 | 0.4 | 0.3 | 0.3 |

EXAMPLE 14

A feedstock blend of 50% JSHGO, identified above in Example 4, and 50% hydrotreated 650° F.+ Arab Light Atmospheric Resid, with properties given in Table 7, was contacted with the amorphous cracking catalyst of Example 2 in a fixed-fluidized bed bench unit at a reaction temperature of 942° F., a weight hourly space velocity of 29.96 hr$^{-1}$ and a cat/oil ratio of 2. The catalyst was pretreated by heating for 0.5 hour at 1200° F. The results of this example appear in Table 8.

EXAMPLE 15

The same feedstock blend as used in Example 14 was contacted in accordance with the present invention with a catalyst inventory comprised of the catalyst of Example 3 (25 wt. % zeolite ZSM-5). The catalyst inventory was heated to 1200° F. for 0.5 hour prior to feedstock contact. The reaction temperature in this example was 938° F., the WHSV was 30 hr$^{-1}$ and the cat/oil was 2. The results are presented in Table 8.

TABLE 7

| Chargestock | HDT 650° F.+ Arab Light Atmos. Resid. |
|---|---|
| Gravity, °API | 22.2 |
| Aniline Pt., °F. | 205.1 |
| Sulfur, wt. % | 0.38 |
| Nitrogen, wt. % | 0.08 |
| Basic Nitrogen, ppm | 311 |
| Conradson Carbon, wt. % | 3.46 |
| Viscosity, KV at 210° F., cs | 13.04 |
| Bromine No. | 1.6 |
| R.I. at 70° F. | 1.4910 |
| Hydrogen, wt. % | 12.5 |
| Molecular Weight | 453 |
| Paraffins, wt. % | 23.9 |
| Naphthenes, wt. % | 26.1 |
| Aromatics, wt. % | 50.0 |
| $C_4$, ndm | 17.4 |

TABLE 8

|  | Example 14 | Example 15 |
| --- | --- | --- |
| Conversion, vol. % | 55.0 | 67.4 |
| $C_5$ + Gasoline, vol. % | 37.1 | 23.9 |
| Total $C_4$'s, vol. % | 18.3 | 22.9 |
| Dry Gas, wt. % | 7.2 | 22.1 |
| Coke, wt. % | 4.25 | 7.51 |
| $H_2$, wt. % | 0.10 | 0.13 |
| $C_5$ + Gasoline + Alkylate, vol. % | 68.8 | 59.3 |
| RON + O, $C_5$ + Gasoline | 92.9 | 97.0 |
| RON + O, $C_5$ + Gasoline + Alkylate | 93.6 | 94.9 |
| n-$C_4$, vol. % | 0.9 | 3.7 |
| i-$C_4$, vol. % | 6.4 | 11.6 |
| $C_4$=, vol. % | 10.9 | 7.6 |
| $C_3$, vol. % | 1.6 | 16.3 |
| $C_3$=, vol. % | 8.0 | 13.8 |
| $C_2$, wt. % | 0.4 | 0.9 |
| $C_2$=, wt. % | 0.5 | 3.0 |

What is claimed is:

1. In a catalytic cracking process designed for cracking a petroleum fraction over an essentially entirely amorphous cracking catalyst comprising contacting said fraction with said amorphous cracking catalyst at a temperature of from about 400° F. to about 1300° F. to provide a product exhibiting a certain octane number, the improvement of contacting said fraction in said process at a temperature of from about 400° F. to about 1300° F. with a catalyst comprising a major amount of amorphous cracking component and a minor amount of crystalline zeolite component characterized by a Constraint Index of from about 1 to about 12 and a silica to alumina mole ratio of greater than about 12 whereby the product of said process exhibits an increased octane number when compared to the same process conducted with an essentially entirely amorphous cracking catalyst.

2. The process of claim 1 wherein said crystalline zeolite component is present at from about 0.01 weight percent to about 25 weight percent of the catalyst.

3. The process of claim 2 wherein said crystalline zeolite component is present at from about 0.01 weight percent to about 10 weight percent of the catalyst.

4. The process of claim 1 wherein said crystalline zeolite component is provided by adding a separate additive composition comprising said zeolite to said amorphous cracking component in the cracking process.

5. The process of claim 2 wherein said crystalline zeolite component is provided by adding a separate additive composition comprising said zeolite component to said amorphous cracking component in the cracking process.

6. The process of claim 3 wherein said crystalline zeolite component is provided by adding a separate additive composition comprising said zeolite component to said amorphous cracking component in the cracking process.

7. The process of claim 1 wherein said crystalline zeolite component is at least one member selected from the group consistng of ZSM-5, ZSM-5/ZSM-11 intermediate, ZSM-11, ZSM-12, ZSM-23, ZSM-35, ZSM-38 and ZSM-48.

8. The process of claim 2 wherein said crystalline zeolite component is at least one member selected from the group consisting of ZSM-5, ZSM-5/ZSM-11 intermediate, ZSM-11, ZSM-12, ZSM-23, ZSM-35, ZSM-38 and ZSM-48.

9. The process of claim 3 wherein said crystalline zeolite component is at least one member selected from the group consisting of ZSM-5, ZSM-5/ZSM-11 intermediate, ZSM-11, ZSM-12, ZSM-23, ZSM-35, ZSM-38 and ZSM-48.

10. The process of claim 4 wherein said crystalline zeolite component is at least one member selected from the group consisting of ZSM-5, ZSM-5/ZSM-11 intermediate, ZSM-11, ZSM-12, ZSM-23, ZSM-35, ZSM-38 and ZSM-48.

11. The process of claim 5 wherein said crystalline zeolite component is at least one member selected from the group consisting of ZSM-5, ZSM-5/ZSM-11 intermediate, ZSM-11, ZSM-12, ZSM-23, ZSM-35, ZSM-38 and ZSM-48.

12. The process of claim 6 wherein said crystalline zeolite component is at least one member selected from the group consisting of ZSM-5, ZSM-5/ZSM-11 intermediate, ZSM-11, ZSM-12, ZSM-23, ZSM-35, ZSM-38 and ZSM-48.

13. The process of claim 7 wherein said zeolite component is ZSM-5.

14. The process of claim 8 wherein said zeolite component is ZSM-5.

15. The process of claim 9 wherein said zeolite component is ZSM-5.

16. The process of claim 10 wherein said zeolite component is ZSM-5.

17. The process of claim 11 wherein said zeolite component is ZSM-5.

18. The process of claim 12 wherein said zeolite component is ZSM-5.

19. The process of claim 1 wherein said amorphous cracking component is a member selected from the group consisting of clay, silica-alumina, silica-magnesia, silica-zirconia, silica-thoria, silica-beryllia, silica-titania, silica-alumina-thoria, silica-alumina-zirconia, silica-alumina-magnesia, silica-magnesia-zirconia, a clay silica mixture and combinations thereof.

20. The process of claim 4 wherein said amorphous cracking component is a member selected from the group consisting of clay, silica-alumina, silica-magnesia, silica-zirconia, silica-thoria, silica-beryllia, silica-titania, silica-alumina-thoria, silica-alumina-zirconia, silica-alumina-magnesia, silica-magnesia-zirconia, a clay/silica mixture and combinations thereof.

21. The process of claim 1 wherein the catalytic cracking takes place in a fluid catalytic cracking process.

22. The process of claim 4 wherein the catalytic cracking takes place in a fluid catalytic cracking process.

23. The process of claim 4 wherein the addition of said separate additive composition occurs during an on-stream operation of the cracking process.

24. The process of claim 4 wherein the separate additive composition is intermittently added.

25. The process of claim 1 wherein a metal selected from the group consisting of platinum, palladium, iridium, osmium, rhodium, ruthenium and rhenium is added to the catalyst in an amount of from about 0.01 ppm to about 100 ppm, based on total catalyst inventory, in order to enhance carbon monoxide conversion.

26. The process of claim 4 wherein a metal selected from the groups consisting of platinum, palladium, iridium, osmium, rhodium, ruthenium and rhenium is added to the separate additive composition in an amount of from about 1.0 ppm to about 1000 ppm, based on total separate additive composition, in order to engance carbon monoxide conversion.

* * * * *

UNITED STATES PATENT AND TRADEMARK OFFICE
CERTIFICATE OF CORRECTION

PATENT NO. : 4,416,765

DATED : November 22, 1983

INVENTOR(S) : Arthur W. Chester, William E. Cormier, Jr., & William A. Stover

Page 1 of 2

It is certified that error appears in the above-identified patent and that said Letters Patent is hereby corrected as shown below:

Column 2, line 1, "5type" should be --5 type--.

Column 4, line 6, "composition. If..." through line 7, "...available, $C_5^+$" should be deleted.

Column 5, line 13, "disruption" should be --disrupting--.

Column 5, line 63, "conprise" should be --comprise--.

Column 6, line 37, "Thise" should be --These--.

Column 6, line 64, "retio" should be --ratio--.

Column 10, line 21, "50 microns" should be --150 microns--.

Column 10, line 51, "genreral" should be --general--.

Column 11, line 62, "kalin" should be --kaolin--.

Column 12, line 65, "240°F" should be --940°F--.

Column 12, line 66, "$hr^{31}$ 1" should be --$hr^{-1}$--.

Column 14, line 3, "1240°F" should be --1450°F--.

Column 15, Claim 4, line 44, "zeolite to said" should be --zeolite component to said--.

UNITED STATES PATENT AND TRADEMARK OFFICE
CERTIFICATE OF CORRECTION

PATENT NO. : 4,416,765

DATED : November 22, 1983

INVENTOR(S) : Arthur W. Chester, William E. Cormier, Jr., & William A. Stover

It is certified that error appears in the above-identified patent and that said Letters Patent is hereby corrected as shown below:

Column 15, Claim 7, line 58, "consistng" should be
--consisting--.

Column 16, Claim 19, line 35, "clay silica" should be
--clay/silica--.

Column 16, Claim 26, line 66, "engance" should be
--enhance--.

Signed and Sealed this

Third Day of July 1984

[SEAL]

Attest:

GERALD J. MOSSINGHOFF

Attesting Officer          Commissioner of Patents and Trademarks